United States Patent [19]

Mentlikowski et al.

[11] 4,305,630

[45] Dec. 15, 1981

[54] CABINET FOR PATCH PANELS USED WITH ANALOG COMPUTERS

[75] Inventors: Donald R. Mentlikowski, St. Clair Shores; James B. Cumbow, Detroit, both of Mich.

[73] Assignee: The United States of America as represented by the Secretary of the Army, Washington, D.C.

[21] Appl. No.: 132,358

[22] Filed: Mar. 20, 1980

[51] Int. Cl.[3] ........................ H02B 1/02; A47B 53/00

[52] U.S. Cl. .................................... 312/320; 312/196; 312/231; 312/233; 361/352

[58] Field of Search ............... 312/195, 196, 231, 233, 312/320; 361/352

[56] References Cited

U.S. PATENT DOCUMENTS

| | | | |
|---|---|---|---|
| 520,128 | 5/1894 | Wood | 361/352 |
| 1,870,553 | 8/1932 | Bullen | 312/233 |
| 3,304,143 | 2/1967 | Connell | 312/231 |
| 3,669,227 | 6/1972 | Alford | 312/231 |
| 4,113,331 | 9/1978 | Derdzinski et al. | 312/231 |

FOREIGN PATENT DOCUMENTS

| | | | |
|---|---|---|---|
| 639453 | 6/1950 | United Kingdom | 361/352 |

*Primary Examiner*—Victor N. Sakran

*Attorney, Agent, or Firm*—Peter A. Taucher; John E. McRae; Nathan Edelberg

[57] ABSTRACT

A cabinet having special utility in patch panel-formation of electric circuits in analog computers. The patch panel is removed from the computer and mounted in an inclined attitude atop the cabinet for easy viewing of circuit holes in the panel face. The cabinet includes cable-storage trays in close proximity to the patch panel, whereby the technician is able to readily select an appropriate length cable for plug-on connection to the panel, necessary to form various electrical circuits. After the panel has been wired it is remounted onto the front face of the analog computer; the cable terminations extend through the panel into electrical connection with terminals permanently located in the computer.

1 Claim, 9 Drawing Figures

CABINET FOR PATCH PANELS USED WITH ANALOG COMPUTERS

The invention described herein may be manufactured, used, and licensed by or for the Government for governmental purposes without payment to us of any royalty thereon.

BACKGROUND AND SUMMARY OF THE INVENTION

Certain types of analog computers are equipped with removable patch panels that facilitate the quick formation of electric circuits in the computer, as necessary to enable the computer to solve problems or equations. Each patch panel is a flat rectangular dielectric unit having a width of about twenty four inches and a length of about thirty inches; it is provided with a large number of small closely-spaced holes sized to receive pin-like terminations on external flexible cables. A representative patch panel has in excess of five hundred circuit holes, each about one quarter inch in diameter; the holes are arranged in rows and columns according to the electrical function of the registering computer circuitry behind the panel. Hole-to-hole spacing is about one quarter inch.

To form problem-solving circuits in the computer it is usually best to patch or build up the cable connections on the patch panel, with the panel removed from the computer. In this way the computer is put to work solving one problem while an otherwise unused patch panel is being wired up for later insertion onto the computer to solve a second problem. The aim is to keep the computer in continuous operation without down time for wiring the patch panel. In the usual mode of operation the patch panel is placed in a prone horizontal position on a desk or workbench. However, it is then difficult for the technician to clearly see the small circuit holes and distinguish one hole from another. The close spacing of the holes leads to hole selection errors, especially after the face of the panel has become obscured by cables plugged onto the panel. Occasionally such errors in hole selection go unnoticed even after the wired-up panel has been installed onto the front face of the computer; in such situations the computer may spend valuable time in unsuccessful attempts to solve the intended equation; computer readout may be incorrect or useless. It is then necessary to remove the cables from the panel and start the panel patching or wiring process again.

The present invention is directed to a cabinet having special utility for supporting a patch panel in a sloped or inclined angle, whereby the technician is able to more readily view the relatively small circuit holes. Another aim is to provide a cabinet that includes three open-topped rectangular trays arranged in front of and alongside the supported patch panel, each of the trays being adapted to store or house a relatively large quantity of cables used in the panel-wiring operation. The trays may be internally partitioned to form chambers of selected lengths, pre-determined according to the different standard commercially-available cable lengths. The tray arrangement and sizing enables the technician to have ready access to a variety of different length cables, as necessary to make any specific hole-to-hole circuit connection, as short as two or three inches or as long as twenty four inches. As the technician becomes familiar with the locational placement of the compartments or trays he/she is able to quickly make the cable length selection without actually looking away from the panel. In this way the technician is able to maintain concentration on the correct (selected) holes until the cable pin terminations are actually in the selected circuit holes. Preferably the technician will be able to utilize the shortest length cable for each hole-to-hole connection, thereby minimizing the maze of wiring that tends to obscure hole locations during the wiring process. A general aim of our invention is to provide a cabinet structure usable to support a patch panel in an easily viewed position close to a supply to various length cables, whereby the programmer is able to build up a circuit system more quickly and with a greater assurance that the circuit will in fact correspond to what is required to provide the desired program.

THE DRAWINGS

Figure 1:
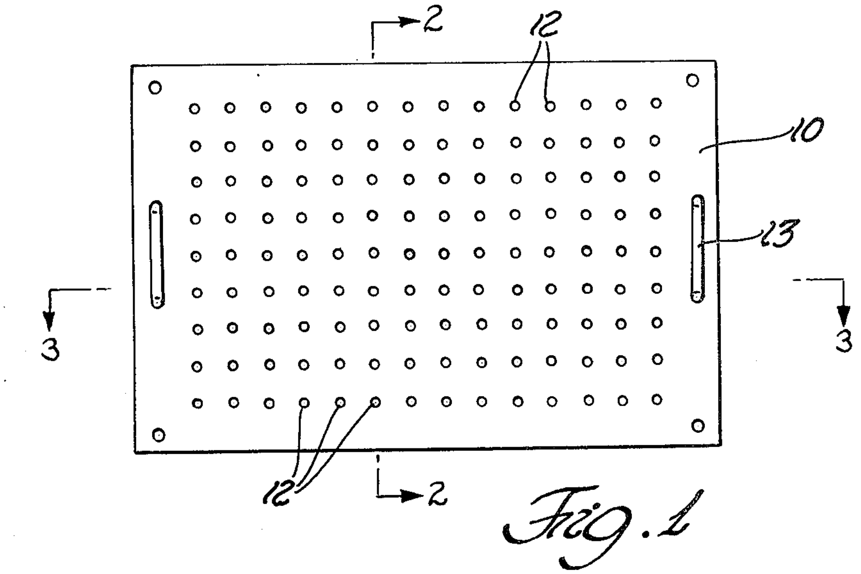
FIG. 1 is a simplified plan view of a patch panel usable with analog computers.
Figure 2:
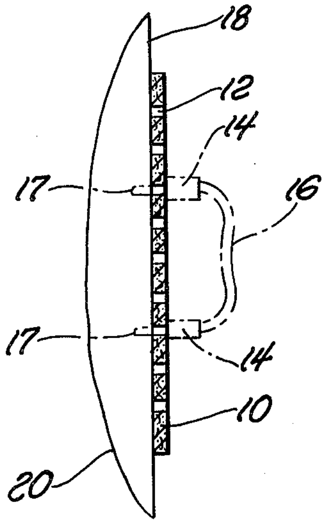
FIG. 2 is a sectional view on line 2—2 in FIG. 1.
Figure 3:
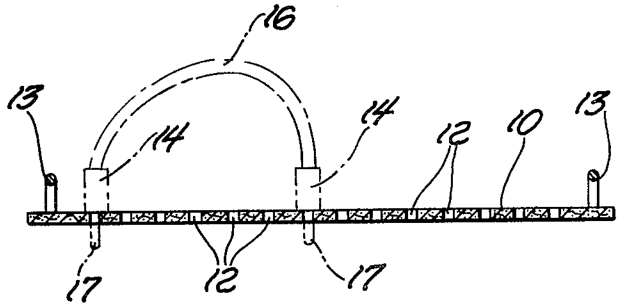
FIG. 3 is a sectional view on line 3—3 in FIG. 1.
Figure 9:
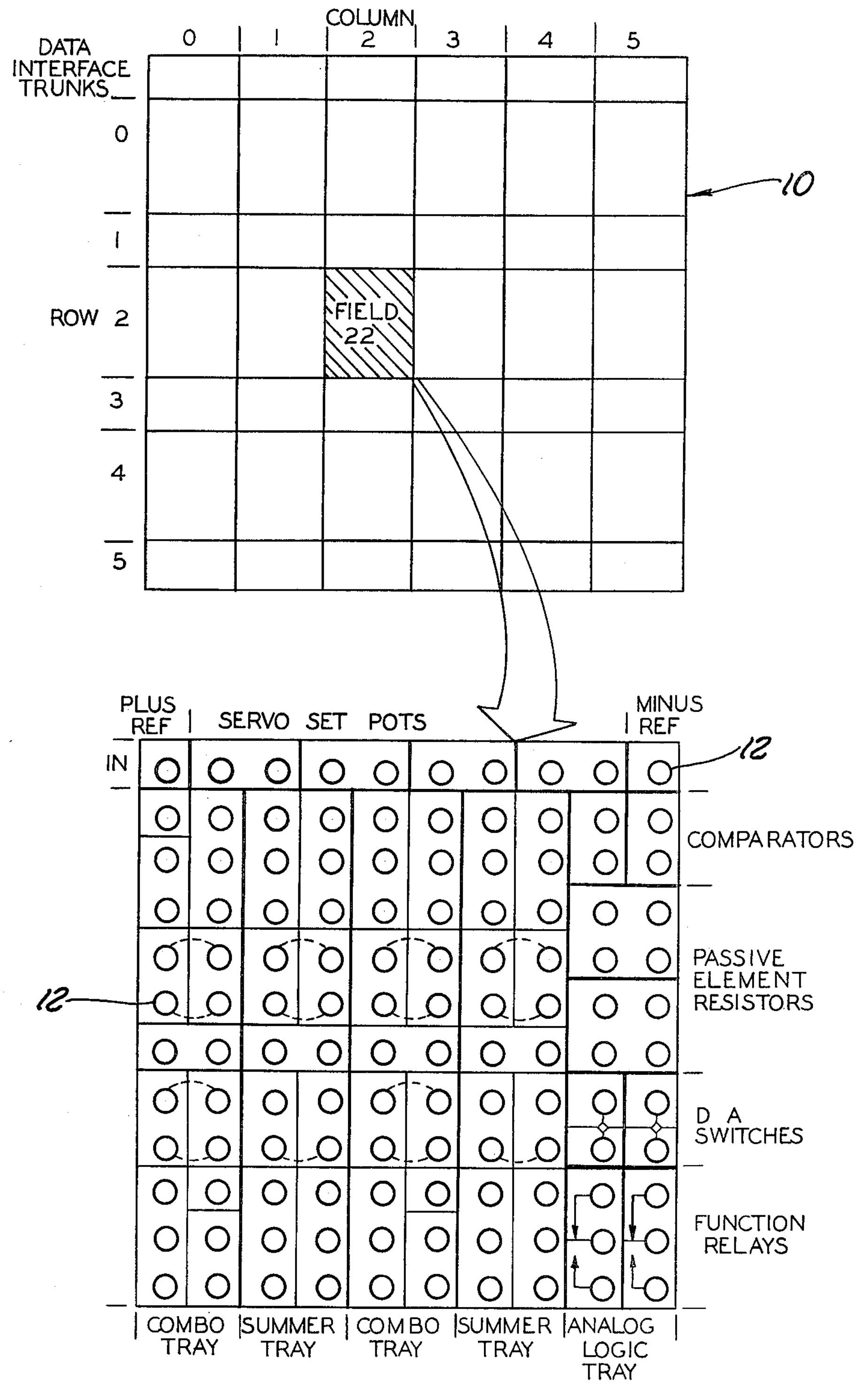
FIG. 9 is a diagrammatic view, partly exploded, showing a hole pattern employed in a representative patch panel for which our invention is intended to be used.

Referring more particularly to FIGS. 1 through 3 and 9, there is shown a rectangular patch panel 10 formed of dielectric material and having a pattern of small holes 12 extending therethrough; the holes are shown approximately actual size in the lower portion of FIG. 9. In actual practice the holes are arranged in numbered rows (along the Y axis) and columns (along the X axis), each row-column combination being arbitrarily designated as a field; FIG. 9 illustrates the hole pattern arrangement in one field. Printed information is associated with each field to identify the function of the particular holes in the computer (behind the patch panel). FIG. 2 fragmentarily illustrates an analog computer 20 having a front face 18 adapted to have patch panel 10 removably mounted thereon. Electrical connections to the various computer circuits are achieved by a series of insulated cables, one of which is shown at 16 in FIG. 2. Each cable is provided with a pin-type termination 17 adapted to fit through a selected one of the patch panel circuit holes 12 to complete an electrical connection with the registering circuit components within the analog computer. The computer is programmed or wired according to the selected placement of the various cable terminations 17 in the circuit holes 12. It is possible to quickly reprogram the computer by changing the cable connections to the various digital-analog switches, summers, amplifiers, comparators, multipliers, resolvers, etc. located within the computer. Preferably the reprogramming operation is performed on a second patch panel 10 at a nearby workbench in the computer room. Each conventional patch panel is equipped with a pair of handholds 13 for removing/installing the panel on the computer, and transporting same to/from the workbench. The patch panel may be approximately twenty four inch by thirty inch in dimensions. Each panel normally contains in excess of five hundred circuit holes 12 spaced apart about one quarter inch.

Figure 4:
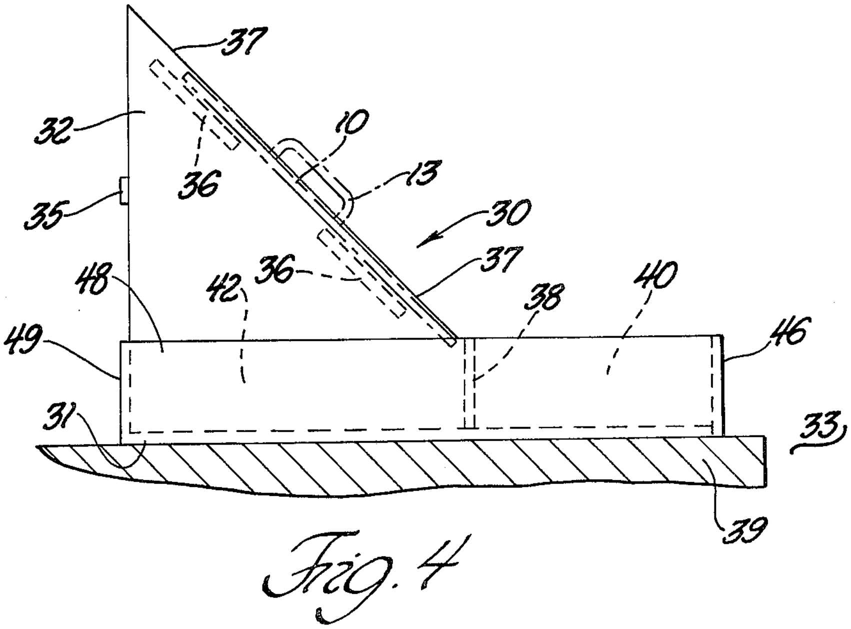
FIG. 4 is a left and elevational view of a patch panel-support cabinet constructed according to our invention.
Figure 5:
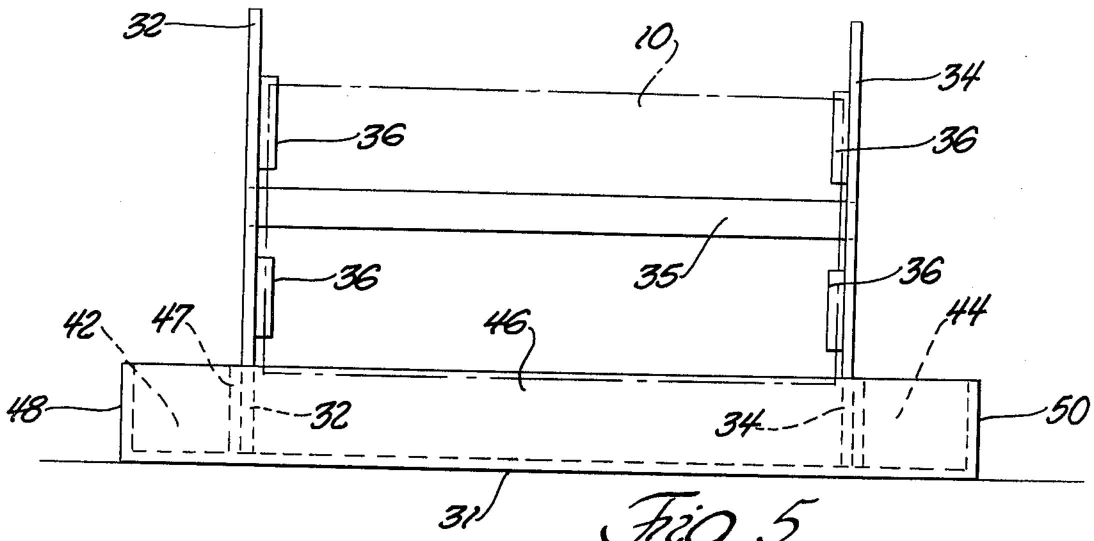
FIG. 5 is a front view of the FIG. 4 cabinet.
Figure 6:
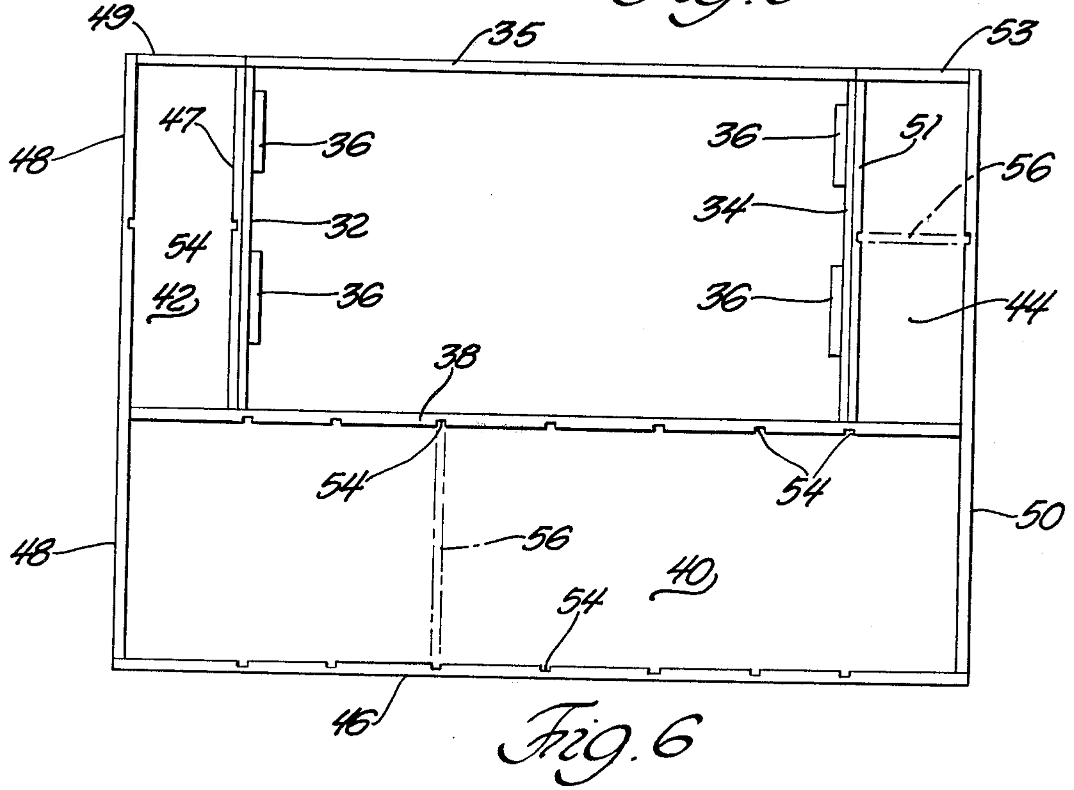
FIG. 6 is a top plan view of the FIG. 4 cabinet.

The cabinet structure 30 shown in FIGS. 4 through 6 is intended to support a patch panel 10 while the programmer is rewiring the panel, preparatory to installation on the computer. The cabinet includes a flat horizontal bottom wall 31 adapted to rest on the upper surface of a conventional desk 39, whereby wall 31 is approximately thirty inches above floor level. In use of cabinet 30 the technician would be seated in front of the desk facing the cabinet; as seen in FIG. 4 the technician would occupy area 33 to the right of the desk.

The cabinet includes two laterally-spaced parallel walls 32 and 34 extending upwardly from bottom wall 31; a cross bar 35 interconnects walls 32 and 34 at their rear edges, but otherwise these two walls are unconnected so that the intervening space between walls 32 and 34 is left open to removably receive the patch panel 10 without dislocating any pin terminations 17 that might be projecting through panel 10. The panel rests on four support bars or cleats 36 extending laterally inwardly from walls 32 and 34. As best seen in FIG. 4, bars 36 are located slightly below, and parallel to, the upper edges 37 of walls 32 and 34; the upper surfaces of bars 36 are inclined in a front-to-rear direction at an angle of approximately forty five degrees relative to a horizontal plane, whereby a person seated in area 33 is enabled to have a reasonably clear view of patch panel 10 while inserting or removing cable pin terminations 17 from/to the panel circuit holes 12. Bars 36 are spaced below the wall upper edges 37 by approximately the panel 10 thickness so that the panel upper face is substantially flush with edges 37; walls 32 and 34 thereby trap the panel against lateral dislocation. The panel lower edge rests against the upper edge of a fixed upstanding cabinet wall 38. The patch panel automatically maintains its position on bars 36 in spite of disturbing manual forces associated with insertion or removal of the cable pin terminations 17 to/from circuit holes 12. No hold-down mechanisms are required to maintain panel 10 in the FIG. 4 inclined position.

Some variation in the design slope angulation of bars 36 is possible; however we believe the bar 36 angle should be within the range of 40 to 50 degrees measured from a horizontal plane. If the bar 36 angle is too steep patch panel 10 will be so upright as to be susceptible to being toppled over when the pin terminations 17 are removed from circuit holes 12. Terminations 17 are usually tight frictional fits in holes 12 so that the pins have a tendency to exert a pull force on the panel during pin termination-removal operations; hence we believe the panel has more stability if it has a relatively small slope angle. On the other hand, if the panel is positioned in a horizontal, or near horizontal, attitude the individual circuit holes 12 are not so easily viewed or distinguished by a technician seated in front of cabinet 39. Also, the technician is then required to lean forwardly over the cabinet; the average person then tends to experience back pain discomfort, which has an adverse effect on human thought processes and dexterity. Bars 36 preferably are sloped at approximately forty five degrees, plus or minus five degrees.

The process of correctly wiring up panel 10 is greatly facilitated if the technician has access to a supply of different length cables 16 without leaving his/her seat in front of desk 39. In this connection, it should be noted that each selected cable should be as short as possible, consistent with the holes being connected, to minimize the mass of wiring on the panel 10 upper face. When the panel is partially obscured by twenty or thirty excessively long cables it becomes difficult to find and locate the precise circuit holes 12 for the succeeding circuit connections.

The cabinet of FIGS. 4 through 6 is equipped with three rectangular cable-storage trays, numbered 40, 42 and 44. Horizontal wall 31 forms the base or bottom for each of the three trays. As seen in FIG. 6, tray 40 is defined by upright walls 38, 46 and the front portions of walls 48 and 50. Tray 42 is defined by upright walls 47, 49 and portions of walls 38 and 48. Tray 44 is defined by upright walls 51, 53 and portions of walls 38 and 50. The defined trays 40, 42 and 44 are located, respectively, directly in front of the patch panel-support area, and in the areas immediately alongside or outboard from the panel support walls 32 and 34. A person seated in front of desk 39 (FIG. 4) has ready hand-access to each of the three cable-storage trays without leaving his/her seat or shifting human eye contact from the panel 10 surface.

Figure 7:
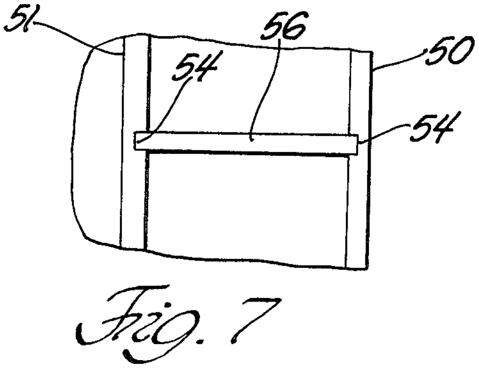
FIGS. 7 and 8 are fragmentary views illustrating structural details used in the FIG. 4 cabinet.
Figure 8:
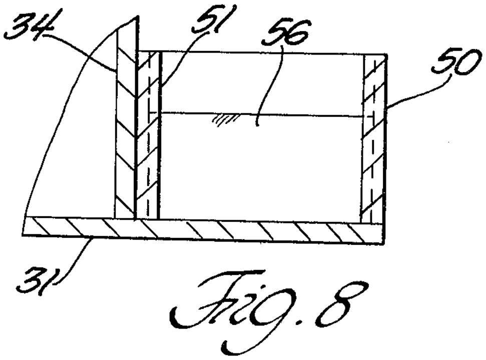

Under conventional practice each cable length is assigned its own sheath coloring, e.g. red, yellow, brown etc. We contemplate that cables of the same length and coloring will be stored at a designated location in one of trays 40, 42 or 44. To achieve this objective we provide each tray with one or more adjustable partitions that subdivide the tray into a number of different length compartments. As best seen in FIGS. 7 and 8, vertical grooves 54 are formed in the tray walls to accommodate a partition 56 that spans the space across the tray. The number of grooves 54 is determined by the anticipated need for tray subdivision or number of cable lengths used. The partition can extend the full depth of the tray or only a partial depth, as shown in FIG. 8. Preferably the partitions are located to subdivide the individual trays into a range of different length cable-storage compartments. The cables are laid straight (uncoiled) so that relatively large numbers of each cable length are available to the person seated in front of the desk-cabinet assembly. Each tray has a preferred depth of approximately five or six inches, sufficient to accommodate a large number of cables. Tray 40 has a length of about forty inches for storing the longest cables, whereas each of trays 42 and 44 has a length on the order of twenty inches. The most-used cable lengths are stored in tray 40, which is the most readily accessible of the three trays.

Trays 40, 42, and 44 are especially useful because the seated technician is able to pick out an appropriate length cable from its stored position immediately after mentally making each circuit hole 12 selection. He can continue to fasten his attention on the selected circuit holes while he picks out the cable from the appropriate tray location.

We wish it to be understood that we do not desire to be limited to the exact details of construction shown and described for obvious modifications will occur to a person skilled in the art.

We claim:

1. A cabinet having special utility in patch panel-formation of electric circuits in analog computers: said cabinet comprising a flat horizontal bottom wall at desk top height, patch panel-support means including two spaced parallel walls extending upwardly from the bottom wall in a front-to-rear direction when viewed by a seated person facing the cabinet, and panel-support bars secured to the facing surfaces of the parallel walls; the parallel walls having upper edges inclined at approximately forty-five degrees, the space between said parallel walls being open so that both faces of a supported patch panel will be unobstructed; the panel-support bars on the panel-support walls being inclined from front-to-rear at an angle of approximately forty-five degrees so that a person seated in front of the cabinet is enabled to have a reasonably clear view of the circuit holes in the patch panel; the panel-support bars being located a slight distance below the upper edges of the panel-support walls so that the patch panel is trapped between the support walls with its exposed upper face substantially flush with the wall upper edges; and means for storing patch panel cables in close proximity to the supported panel; said cable-storing means comprising a first rectangular tray positioned on the aforementioned bottom wall directly in front of the panel-support area, a second rectangular tray positioned on the aforementioned bottom wall in the area immediately outboard from one of the panel-support walls, and a third rectangular tray positioned on the aforementioned bottom wall in the area immediately outboard from the other panel-support wall.

* * * * *